No. 740,527. PATENTED OCT. 6, 1903.
J. R. CARTER.
COUPLING.
APPLICATION FILED MAR. 4, 1903.
NO MODEL. 3 SHEETS—SHEET 1.
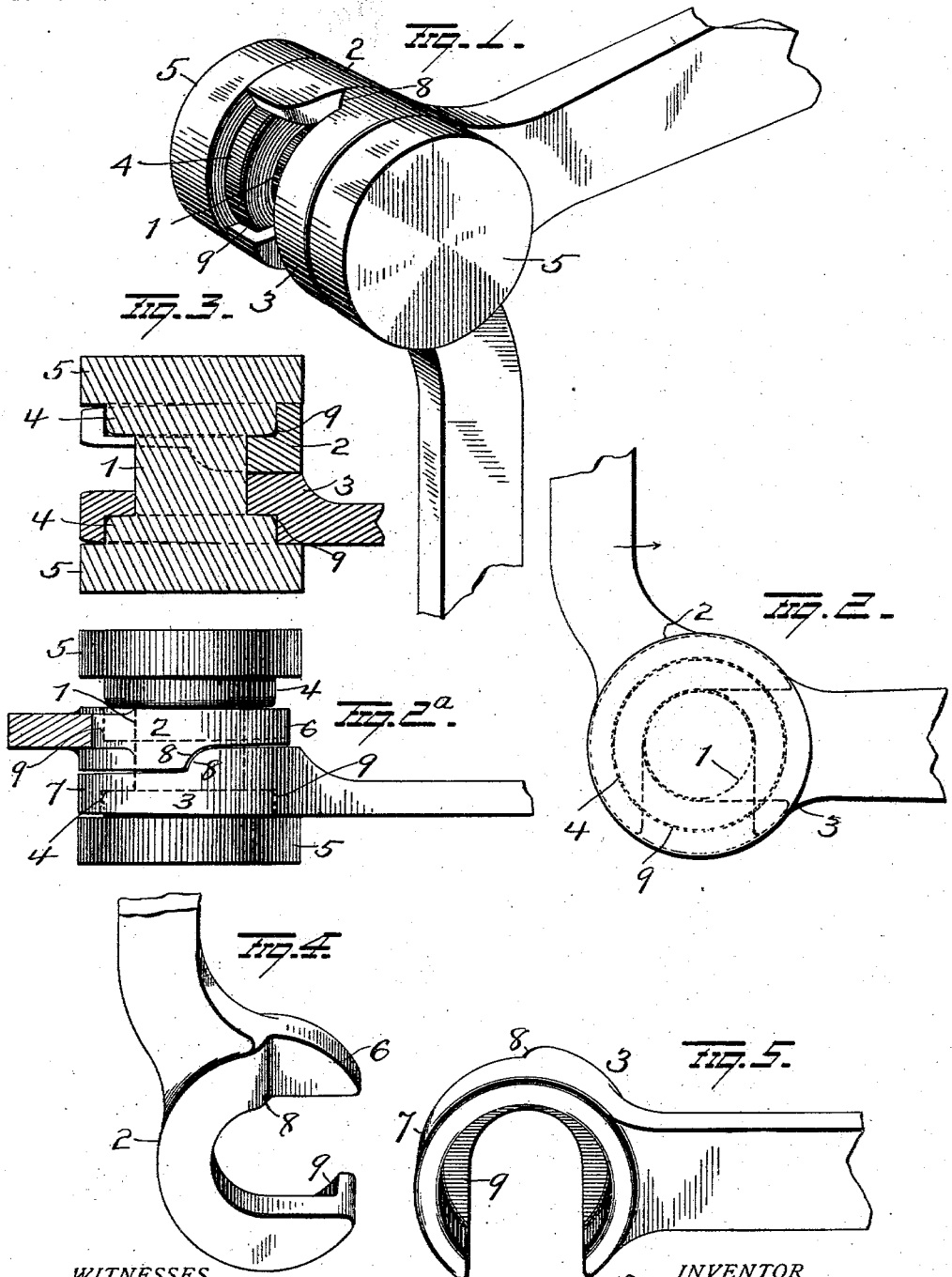
WITNESSES
E. L. Nottingham
H. G. Nottingham
INVENTOR
John R. Carter
By H. A. Seymour
Attorney

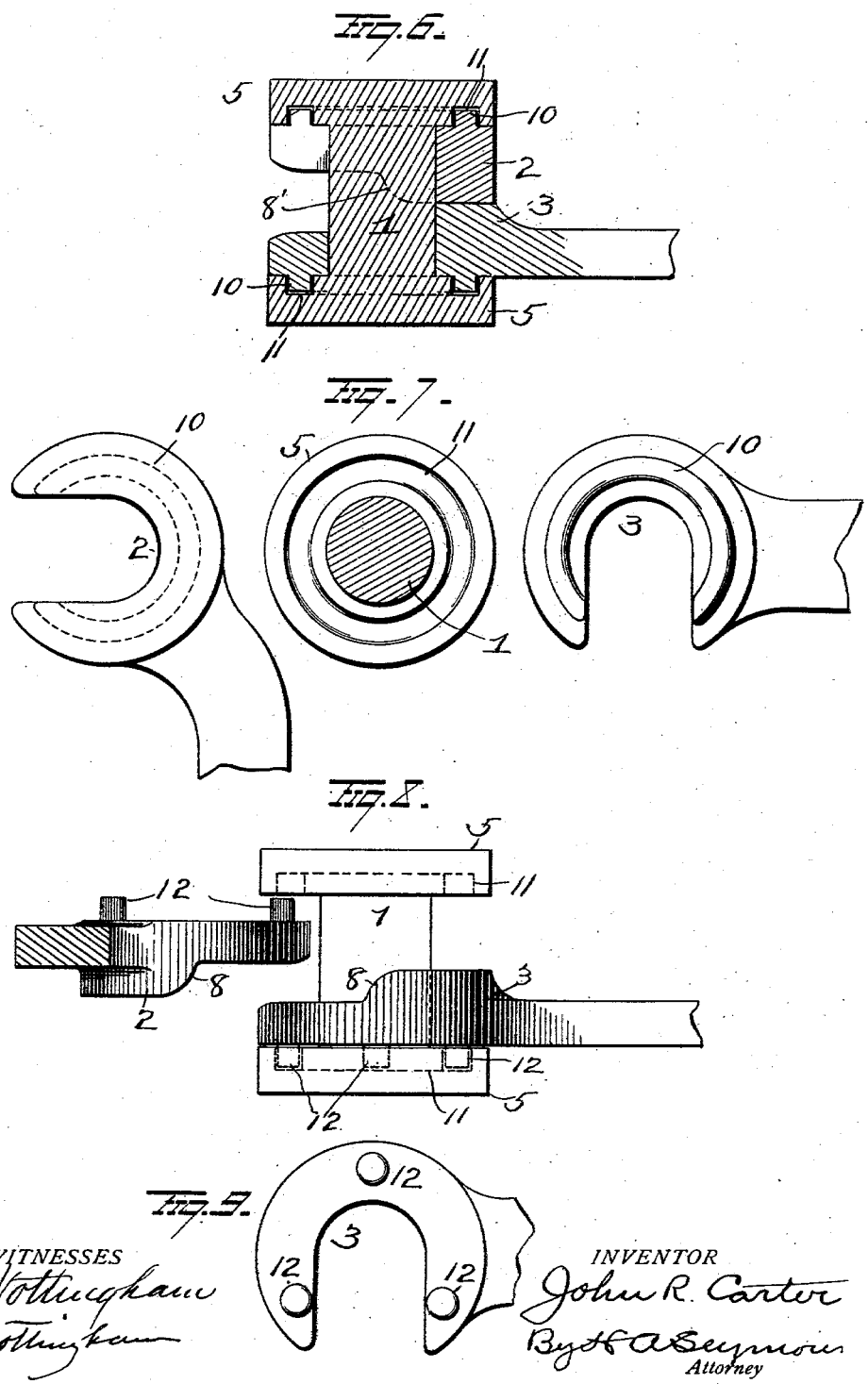

No. 740,527. PATENTED OCT. 6, 1903.
J. R. CARTER.
COUPLING.
APPLICATION FILED MAR. 4, 1903.
NO MODEL. 3 SHEETS—SHEET 3.
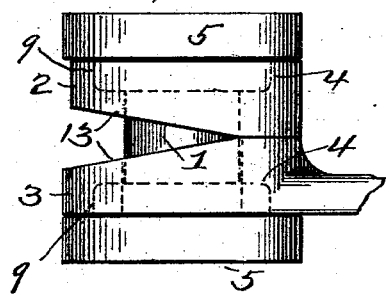
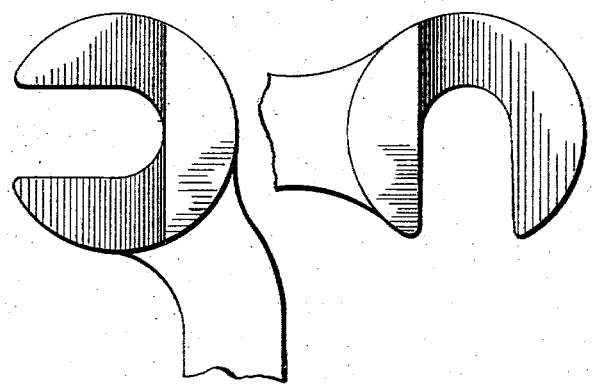
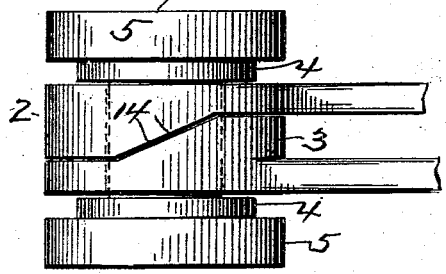
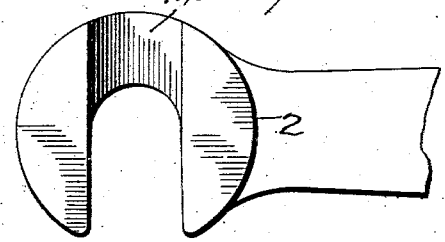
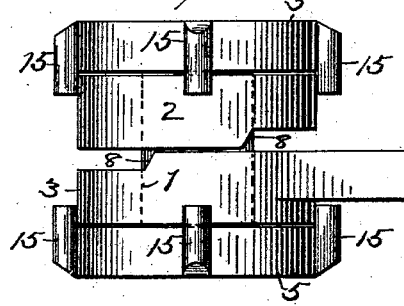
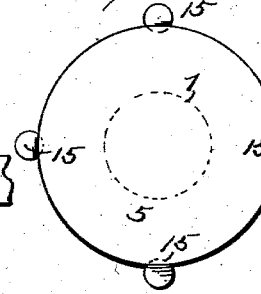
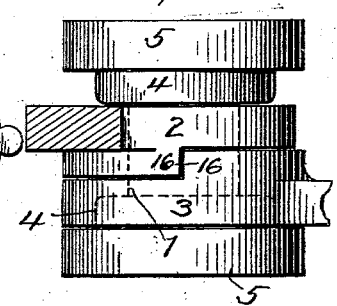
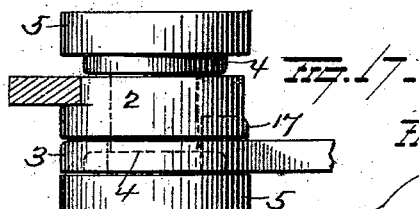
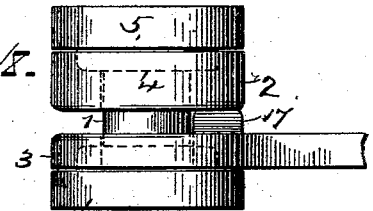
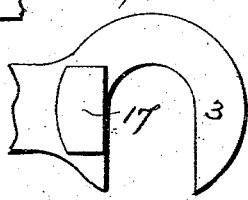
WITNESSES
E. L. Nottingham
S. G. Nottingham
INVENTOR
John R. Carter
By H. A. Seymour
Attorney No. 740,527. Patented October 6, 1903.

UNITED STATES PATENT OFFICE.

JOHN R. CARTER, OF AUGUSTA, KENTUCKY, ASSIGNOR TO ERNST H. HUENEFELD, OF CINCINNATI, OHIO.

COUPLING.

SPECIFICATION forming part of Letters Patent No. 740,527, dated October 6, 1903.

Application filed March 4, 1903. Serial No. 146,162. (No model.)

*To all whom it may concern:*

Be it known that I, JOHN R. CARTER, a resident of Augusta, in the county of Bracken and State of Kentucky, have invented certain new and useful Improvements in Couplings; and I do hereby declare the following to be a full, clear, and exact description of the invention, such as will enable others skilled in the art to which it appertains to make and use the same.

My invention relates to an improved coupling, and more particularly to an improved coupling for pitmen and crank-shafts, an object of the invention being to provide hook-shaped members having coöperating cams, wedges, or enlargements which when the members are partially turned will force the hooks laterally into locked engagement with the coöperating structure of the crank shaft or journal, and thereby insure the retention of the hooks on the shaft or journal until they are turned to a position to bring the cams, wedges, or enlargements adjacent to each other, or, in other words, to a position to bring the outer faces of the hooks nearer together and permit their disengagement with the coöperating locking structure of the shaft or journal.

With this object in view the invention consists in certain novel features of construction and combinations and arrangements of parts, as will be more fully hereinafter described, and pointed out in the claims.

In the accompanying drawings, Figure 1 is a perspective view illustrating the normal operative position of the several parts. Figs. 2 and 2ª are views in elevation, showing the hooks in their position of assembling or disconnection. Fig. 3 is a view in section. Figs. 4 and 5 are views of the hooks removed, and Figs. 6, 7, 8, 9, 10, 11, 12, 13, 14, 15, 16, 17, 18, and 18ª are views illustrating modifications.

1 represents the crank shaft or journal, and 2 and 3 the hooks to be coupled thereon. The shaft or journal 1 has annular shoulders 4, spaced apart, and circular heads or enlargements 5. These heads or enlargements are not at all essential to my invention and are only employed to conform to the diameter of the hooks and make a neat and flush coupling.

One end of hook 2 is contracted as shown at 6 and the opposite end of hook 3 is concontracted as shown at 7, and the hooks each have on their inner faces cams or beveled shoulders 8 at the juncture of their contracted and wider portions, and the outer faces of both hooks are made with circular recesses 9 to receive the annular shoulders 4 of the shaft or journal 1.

To assemble the coupling, hook 2 is inserted on shaft 1 and moved laterally until the annular shoulder 4 at one side is in the recess 9 of this hook. Hook 3 is then inserted on shaft 1 in the position shown in Fig. 2, the contracted portions 6 and 7 of the hooks permitting hook 3 to be thus inserted onto shaft 1. In this position it will be seen that the cams or beveled shoulders 8 lie adjacent to each other, so that when either hook is turned on the shaft the cams or shoulders will force hook 3 over onto annular shoulder 4 and hold both hooks in their extended position to turn on annular shoulders 4. As the openings between the members of each hook are of only just sufficient size to permit the hooks to be inserted on shaft 1, when they are on the annular shoulders 4, which are of greater diameter than the shaft, they cannot be drawn therefrom and the hooks cannot be removed until they are turned to a position to bring the cams or inclined shoulders 8 adjacent to each other, with the contracted portions 6 of one hook against the enlarged portion of the other hook, when they can be moved laterally off the annular shoulders 4 and then removed from shaft 1.

While my improvements are especially adapted for use on washing-machines and I have shown the hooks integral with pitmen for connecting with the upper and lower rubbers of the washer, the coupling has a great many other uses and may be modified without departing from my invention, and I have illustrated several modifications showing slight departure in construction.

In Figs. 6 and 7 I show the hooks 2 and 3 made on their faces with circular flanges 10 to be forced into annular grooves or recesses 11 in the heads or enlargements 5 when the hooks are forced laterally by these cams or shoulders 8.

In Figs. 8 and 9 I illustrate the hooks provided with outwardly-projecting lugs or pins 12 to enter the grooves or recesses 11 in heads 5, and it is manifest that the heads may have these pins and the hooks grooved to receive them.

Instead of having abrupt shoulders or cams 8, as above described, I might construct the hooks as shown in Figs. 10 and 11. In this form of my invention the hooks are inclined or tapered, forming long cam-faces 13, which coöperate to move the hooks laterally into locked engagement with the shaft.

In Figs. 12 and 13 I illustrate how the hooks can be assembled and inserted together onto the shaft. In this construction the hooks are made widest throughout one member and narrowed throughout the other member, with cams or inclined shoulders 14 at their juncture, so that the hooks fit together and can be inserted in this position onto the shaft, and when one is turned the cams will move the hooks apart and into locked engagement with the shaft, or I might, as shown in Figs. 14 and 15, dispense altogether with the annular shoulders 4 and provide the heads 5 with inwardly-projecting pins 15, which serve to hold the hooks on the shaft when forced thereunder by the lateral movement of the hooks caused by the action of cam-faces 8.

While I have described the hooks as having cam-faces, they may have abrupt shoulders 16 instead, as shown in Fig. 16, although I prefer to incline the shoulders, which makes easier the coupling operation.

In Figs. 17, 18, and 18ª I illustrate only one hook as having a cam or enlargement 17 thereon. The other hook is of the same thickness throughout and is moved onto the shaft with its coöperating hook in the position shown in Fig. 17, and when either hook is turned the enlargement 17 will force them apart and into locked engagement with the shaft.

It will thus be seen that my invention is broadly to the idea of constructing the hooks so that when turned out of their position of assembling they will be moved laterally to lock with the shaft, and a great many other slight changes might be made without departing from my invention.

Having fully described my invention, what I claim as new, and desire to secure by Letters Patent, is—

1. A coupling comprising a journal and two hook-shaped members mounted on the journal and movable on said journal laterally with respect to each other, said parts provided with coöperating locking means.

2. A coupling comprising a journal and two hook-shaped members movable laterally on the journal, said parts provided with coöperating locking means and said hook-shaped members having means for moving them laterally.

3. A coupling comprising a journal, two hook-shaped members movable laterally thereon, said parts having coöperating locking means, and said hook-shaped members provided with coacting cams to cause them to move laterally when said members are turned relatively to each other.

4. A coupling comprising a journal two hook-shaped members to engage the same, having means for moving them laterally on the journal and said parts provided with means for locking the members to the journal when said members have been moved laterally.

5. A coupling comprising two hook-shaped members, and a shaft or journal, the hook-shaped members having enlargements or cams on the adjacent faces to move them apart when one hook is turned out of its position for assembling, and the shaft or journal provided with means to engage the hooks when moved laterally and lock them on the shaft.

6. A coupling comprising two hook-shaped members and a shaft or journal of a diameter just small enough to permit the hooks to be inserted thereon, said hooks having cams or enlargements on the adjacent faces to move them laterally when one hook-shaped member is turned out of its position for assembling, and the shaft provided with annular shoulders to enter grooves or recesses in the outer faces of the hooks to lock the latter on the shaft.

7. A coupling, comprising two hook-shaped members, a shaft of just small enough diameter to receive the hooks, the hook-shaped members provided with cams or enlargements on the adjacent faces which can be so disposed as to permit the hooks to fit closely together when placed on the shaft and which, when one hook is turned out of its position for assembling will move the hooks laterally, and said shaft having means to engage the hooks when moved laterally to lock them to the shaft.

In testimony whereof I have signed this specification in the presence of two subscribing witnesses.

JOHN R. CARTER.

Witnesses:
S. W. FOSTER,
A. W. BRIGHT.